United States Patent [19]

Béguin et al.

[11] 4,017,176

[45] Apr. 12, 1977

[54] MACHINE FOR COLOR REPROGRAPHY, INTENDED FOR PRODUCING COLOR SEPARATIONS OF AN ORIGINAL

[75] Inventors: René Béguin, Geneva; Roland Monti, Cologny, both of Switzerland

[73] Assignee: Sublistatic Holding S.A., Glaris, Switzerland

[22] Filed: May 21, 1975

[21] Appl. No.: 579,725

[30] Foreign Application Priority Data

May 28, 1974 Switzerland .......................... 7238/74

[52] U.S. Cl. .................................... 355/32; 355/51; 355/71

[51] Int. Cl.[2] ..................... G03B 27/32; G03B 27/52

[58] Field of Search ............... 355/4, 32, 71, 51, 36

[56] References Cited

UNITED STATES PATENTS 3,848,990 11/1974 Otubo et al. .......................... 355/4

*Primary Examiner*—Richard A. Wintercorn

*Attorney, Agent, or Firm*—Burgess, Dinklage & Sprung

[57] ABSTRACT

Machine for colour reprography includes an exposure device and a support for the original, movable relative to one another. The exposure device includes an objective so constructed as to concentrate the light reflected by the original onto a photosensitive surface, the sweeping of the original being achieved by virtue of a reciprocating movement of the exposure device relative to the support for the original. The exposure device comprises an assembly of optical filters located in superposed filter-holder slides which are movable along a direction parallel to the sweeping movement, between two setting positions, one being a storage position not interposed in the light beam and the other being an operating position which cuts across this beam. The slides cooperate at one end of the sweep travel, with a stop device which pushes all the slides back into one of the setting positions. The stop device operates as a retainer which make it possible selectively to operate certain of the slides.

11 Claims, 11 Drawing Figures

MACHINE FOR COLOR REPROGRAPHY, INTENDED FOR PRODUCING COLOR SEPARATIONS OF AN ORIGINAL

BACKGROUND OF THE INVENTION

The present invention relates to a machine for colour reprography, intended for producing colour separations of an original.

According to a customary colour reprography process, the colour separation of the original is carried out by recording several images obtained by successive exposures on different photosensitive surfaces, the exposures being made through appropriate filters, and then these images are superposed so as to give a copy of the original by recomposition.

In certain known photocopiers, the recording of an image on a photosensitive surface (which may be photoconducting, photopolymerizable or the like) in the form of a light image is effected by means of an exposure device which is movable relative to a support intended to receive the original, and this device comprises an objective which is so constructed as to concentrate light reflected by the original onto a surface which is to be printed, in the course of a sweeping movement which extends over the whole of this surface.

To obtain colour separations on such machines, different optical filters must be selectively interposed in the path of the light beam during successive sweeps of the original.

SUMMARY OF THE INVENTION

A first object of the invention is to provide a machine of this type which comprises an exposure device and a support for the original, which are movable relative to one another, the exposure device being so constructed as to concentrate light reflected by the original onto a photosensitive surface, and sweeping of the original being achieved by virtue of a reciprocating movement of the exposure device relative to the original, this machine havng a simple and improved arrangement for selecting the optical filter or filters which must be interposed in the path of the light beam during each sweep.

For this purpose, the machine according to the invention is characterized in that the exposure device comprises a magazine containing an assembly of optical filters located in superposed filter-holder slides which are movable in the magazine, along a direction parallel to the sweeping movement, between two setting positions, one of which is a storage position not interposed in the light beam and the other of which is an operaing position which cuts across this beam. The slides cooperate, at one end of the sweep travel, with a stop device which pushes all the slides back into one of the setting positions by virtue of the movement of the exposure device relative to the support for the original. The stop device operates as a retainer which makes it possible to selectively operate certain of the slides and hold them back momentarily during the movement, in the opposite direction, of the exposure device relative to the original, for the purpose of bringing the slides thus selected into the other setting position.

The retainer employed can be, for example, magnetic, such as electromagnets or permanent magnets electromagnetically preselected, acting on fittings (magnetizable pieces) attached to the edge of the filter-holder slides facing this stop.

The colour reprography machines comprising an exposure device according to the invention in general also comprise a device for the development of the exposed light images. This device preferably comprises dispensers of (appropriate) products (for example dyestuffs), under which the printed photo-sensitive films pass in succession, and a control device for selectively bringing these dispensers into operation.

These dispensers can, for example, be movable between a storage position and a dispensing position; the control device then preferably comprises a movable actuating bar which has a part located in the path of the exposure device which is movable and actuates the bar in the course of a sweeping movement.

BRIEF DESCRIPTION OF THE DRAWINGS

The attached drawings represent, by way of example, an embodiment of the machine which forms the subject of the invention.

DETAILED DESCRIPTION OF THE INVENTION

The machine shown comprises, in its upper part, a transparent exposure table 1 which forms a support for the original which is to be reproduced, and which is shown at A.

Figure 1:
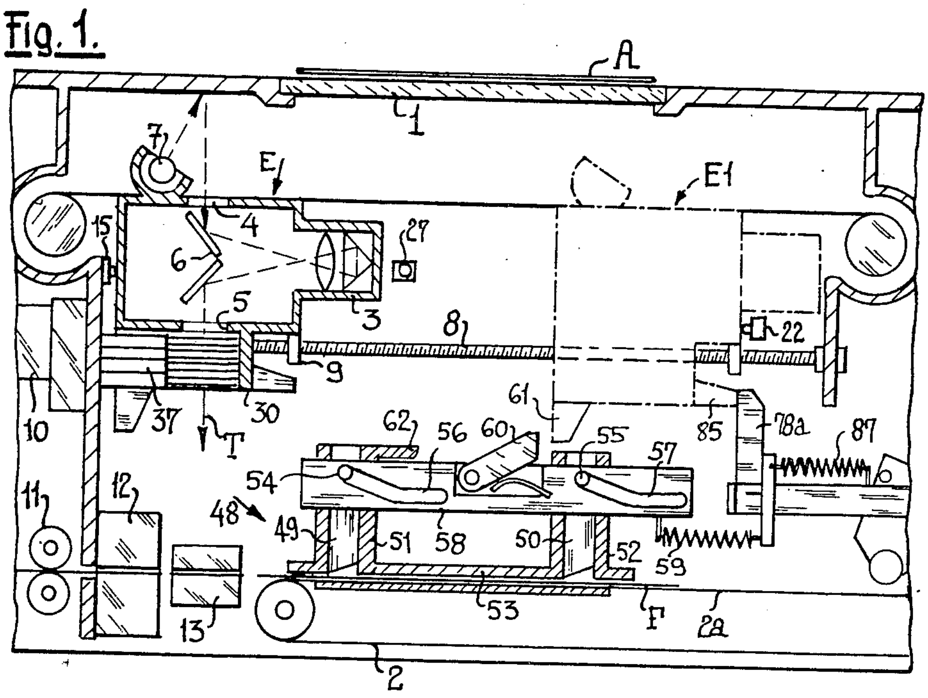
FIG. 1 is a view of a part of the machine, in longitudinal section.

In its lower part, the machine has an endless conveyor belt 2, which advances intermittently, and the upper length 2*a* of which forms a support for a photosensitive film F shown in the printing position in FIG. 1.

The film F is intended to record a light image of the original, the recording operation described below being repeated on successive films each corresponding to a particular colour separation, and the different films thereafter being used to recompose a colour copy of the original by superposition.

The recording of the image on the film F is achieved by means of a movable exposure device E executing a reciprocating movement between two positions indicated in FIG. 1, the device being shown in section at E on the left of FIG. 1, in one extreme position, and in dashes and dots at E1, on the right of the figure, in the other extreme position. The device E, which occupies a stop position in the extreme left position, executes one forward movement and one return movement during the recording of one image. Device E comprises a carriage 3, mounted on rails (not shown), and is in the shape of a box having upper slits 4 and lower slits 5, between which is set up an objective 6 located so as to concentrate, onto the film F, the light coming from a light source 7, which will have been reflected from a transversal area of the original, the sweeping effected as a result of the travel of the carriage from left to right ensuring the reproduction of the entire original.

Figure 9:
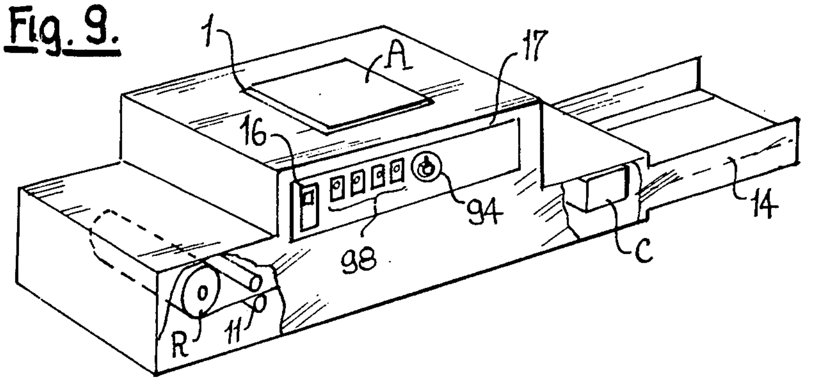
FIG. 9 is a perspective view of the machine.
Figure 10:
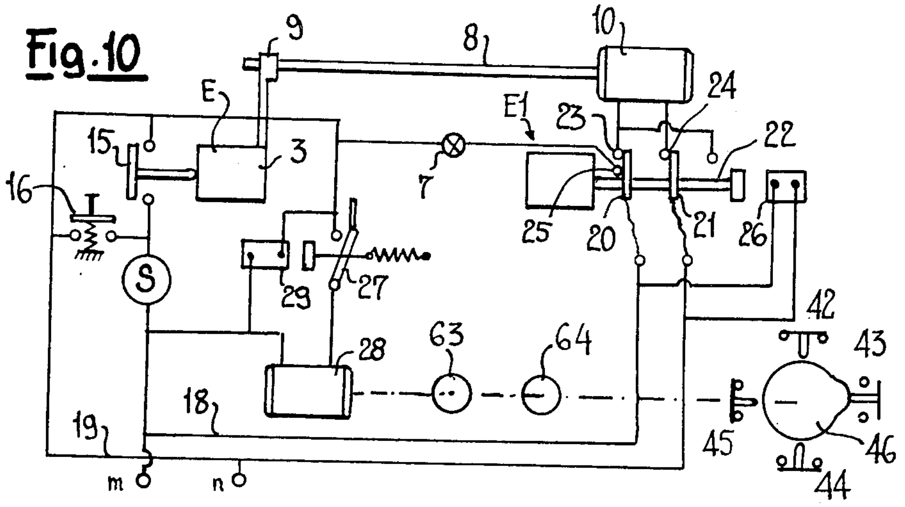
FIGS. 10 and 11 are circuit diagrams for the machine.

The travel of the carriage 3 is controlled by a guide-screw 8 co-operating with a nut 9 and driven by a motor 10 (FIGS. 1 and 10). It can also be operated by a system comprising a cable and a motor-operated pulley. The film F, coming from a roll R (FIG. 9) is fed onto the conveyor 2 by a feed device 11, followed by a cutting device 12 and then by a charging device 13 in which its surface is charged electrically.

After a period during which it is stationary on the conveyor 2, which is then in the stopped position, and during which it is exposed in the position indicated at F, the exposed film carried along by the conveyor passes into a developing device B (FIG. 2) and then into a fixing device C (FIG. 9), before being deposited in a container 14 (FIG. 9). The various devices operate synchronously, as described below.

The motor 10 is fed from a source of electricity S by circuits wired up in accordance with the diagram in FIG. 10.

At the start, the carriage 3 is in its extreme left position (FIG. 1), in which it keeps a limit switch 15 in the open position (FIG. 10). The momentary closing of a starter switch 16 located on the panel 17 of the machine (FIG. 9) results in the motor 10 being fed by the leads 18 and 19 and the strips 20 and 21 of a reversing switch 22, which now are connected to the terminals 23 and 24 of the motor, which starts to revolve in the direction corresponding to the carriage 3 travelling to the right. When the carriage has started, the switch 15 closes so that the switch 16 can be released. The closing of the switches 16 or 15 also causes the light source 7 to light up via a terminal 25 of the reversing switch 22.

The exposure device E now describes a forward movement, from left to right, during which an image is printed on the film F carried by the conveyor 2, which is now moving.

When the carriage 3 arrives at the extreme right of its travel, it shifts the reversing switch 22 to the right (FIG. 10). This has the effect firstly of reversing the feed to the motor 10 and secondly of breaking the supply of the lamp 7. An electromagnetic retaining device 26 retains the reversing switch 22 in its new position so that the motor is fed and the carriage 3 now describes a return movement until it reaches its initial position, where it opens the switch 15, which breaks the feed to the motor 10 and allows the reversing switch 22 to return to its original position shown in FIG. 10.

During its return, the carriage 3 actuates, in passing, first of all a perforating device 48 described later, which perforates register cut-outs in the film F.

The profile of the cut-outs produced by the perforator is such that the parts cut out remain attached to the film F. Thus they are removed with the film and all the inconvenience which could be caused, in particular jamming in the apparatus, is avoided. Furthermore, a simplification of the apparatus also results because it is no longer necessary to provide a receptacle for the detached fragments of paper.

Thereafter, the carriage 3 actuates a switch 27 which provides the feed for an auxiliary motor 28 which drives the conveyor 2, which in turn removes the exposed film F as described later. An electromagnetic retaining device 29 keeps the switch 27 closed until the carriage 3 has regained its initial position.

The device 48 can also be actuated electrically by the movement of the camera, for example by replacing the finger 61 (FIG. 1) by a contact connected to the reversing switch 22, or connected directly to the cam which triggers the illumination when the film F has stopped.

Figure 4:
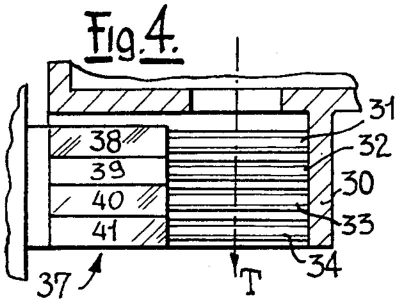
FIGS. 4 and 5 are partial views, on a larger scale, of a filter-holder magazine of the machine, in two different operating positions.
Figure 5:
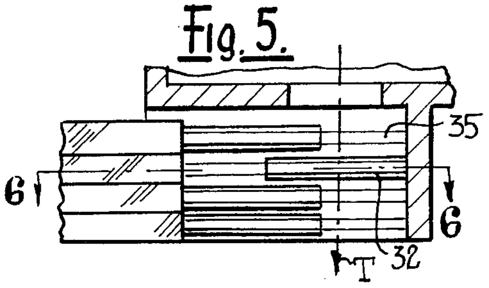
Figure 6:
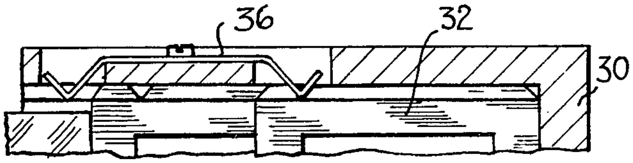
FIG. 6 is a section along line 6—6 of FIG. 5, on a larger scale.

The carriage 3 possesses, at its base, a magazine 30 for the optical filters located in four filter-holder slides 31, 32, 33 and 34 mounted so as to slide in horizontal guide grooves (FIGS. 4, 5 and 6). The slides arranged parallel to one another and at right angles to the path T of the light emitted through the objective 6 can slide in these grooves, between a storage position in the extreme left of the magazine, where the filters are not interposed, and an operating position, in the extreme right of the magazine, where the filters intersect the light beam. The slides are held in one or other of these positions by elastic strips 36 which form elastic catches which co-operate with notches in the slides (FIG. 6). Any other retaining or blocking system, employing, for example, springs, valves and the like, and able to maintain the slides, during the sweep, in one of the two setting positions, without, however, irresistably opposing the force which causes them to change their position in the course of the selection process, can also be used. The slides can consist simply of a transparent plate to which the filter is glued. It is even possible to avoid the use of transparent plates by using a metal frame comprising two stop-blocks (for example soft steel magnetizable stop-blocks) and equipped with holes or countersinks which alloy a nylon thread or metal wire to be fitted so as to intersect diagonally. This device thus makes it possible to hold the filter while avoiding skewing.

In the starting position of the carriage 3, the four slides 31, 32, 33 and 34 are brought into their right-hand position, as a result of their coming to rest against a stop device 37 comprising four retaining electromagnets 38, 39, 40 and 41 which are superposed, each corresponding to one of the slides. The slides possess magnetic fittings facing the electromagnets and when the carriage 3 starts, the electrically fed electromagnets retain the corresponding slides, which thus pass into their storage position, while the slides which are not retained remain in the operating position, in the part to the right of the magazine, throughout the reciprocating movement of the carriage.

Figure 11:
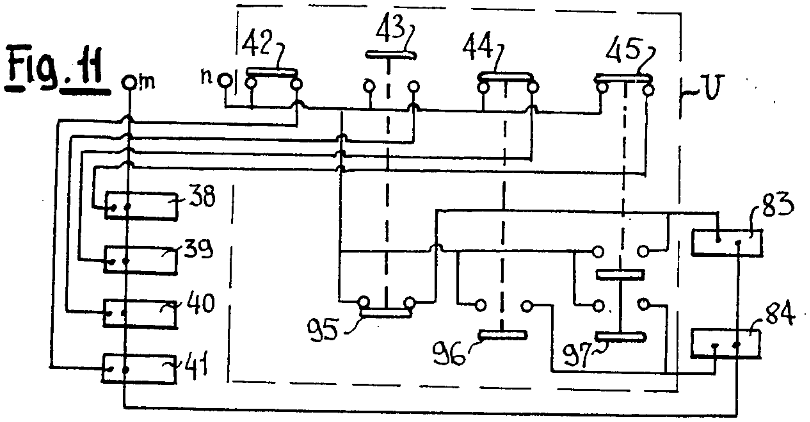

The feed to the electromagnets 38 to 41 from the source S is controlled by four switches 42, 43, 44 and 45 (FIGS. 10 and 11). Thus, in the circuit diagrams in these figures, the switches 42, 44 and 45 are closed whilst the switch 43 is open. As a result, the three slides 31, 33 and 34 are brought into the storage position when the carriage starts (FIG. 5) and only the slide 32, which is not retained, remains in the operating position (FIG. 5).

The four switches 42 to 45 are located, for example, around a cam 46 which rotates by a quarter of a turn each time the motor 28 is actuated, so that the switches are closed in turn and the four filter-holder slides are each brought in turn into the operating position by successive sweeping movements of the carriage 3.

During the return travel, the carriage 3 actuates a perforating device 48 (FIG. 1) which punches register holes in the edge of the film F which has just been printed, before the conveyor 2 is started.

The device 48 comprises punches 49 and 50 which slide vertically in tubular columns 51 and 52 firmly fixed to a sole plate 53 which has a longitudinal slot through which passes an edge portion of the film. Pegs 54 and 55 firmly fixed to the punches engage in inclined slots 56 and 57 of an actuating bar 58 which a spring 59 draws to the right, in the position shown in FIG. 1. The bar 58 carries a catch 60 located in the path of a projection 61 of the carriage 3. When the carriage 3 travels to the left (FIG. 1), the projection 61 comes up against the catch 60 and shifts the bar 58 to the left, which has the effect of lowering the punches. During this movement of the bar 58, an inclined surface of the catch 60 comes up against a plate 62, causing the lowering of the catch, which becomes disengaged from the projection 61. The bar 58, thus freed, now resumes its initial position, so that the punches rise and the film F, provided with register cut-outs, can continue its travel.

The rise of the punches is terminated before the carriage 3, in the course of its travel, actuates the switch 27 which temporarily feeds the auxiliary motor 28. This motor, via couplings shown schematically at 63 and 64 (FIG. 10), ensures, on the one hand, that the conveyor 2 is driven so as to remove the printed film F towards the right and, on the other hand, that the feed device 11 and cutting device 12 are actuated so as to bring a new film into the printing position.

Figure 2:
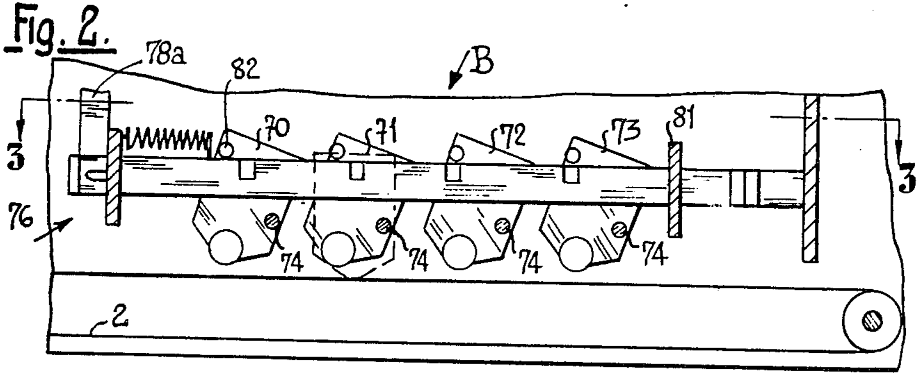
FIG. 2 is a view of the part of the machine which follows on to the right of that shown in FIG. 1, this FIG. 2 being in longitudinal section along line 2—2 of FIG. 3.
Figure 3:
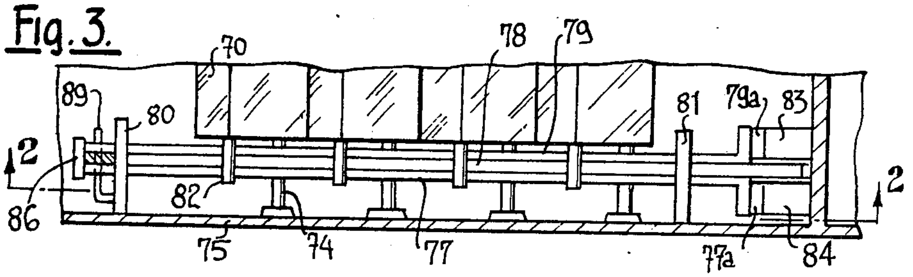
FIG. 3 is a plan view of the machine, partially in section along line 3—3 of FIG. 2.

The printed film removed towards the right by the conveyor 2 is caused to pass through the developing device B shown in FIGS. 2 and 3. This device comprises four dispensers 70, 71, 72 and 73, of known construction, each comprising a trough for a developer and a distributor which allows this developer to be dispensed over the entire width of the film during its travel. The developer adheres to the parts of the film which have not been exposed and are still charged electrically, while it is not retained on the exposed parts.

The dispensers 70 to 73 are pivoted by means of pins 74 on end-plates 75 (FIGS. 2 and 3). They can either occupy a raised position shown by the solid lines in FIG. 2, in which the distributors are lifted off the conveyor belt, or a lowered position shown in broken lines in the case of the dispenser 71 (FIG. 2), in which the distributor comes into contact with the film being carried along.

The position of the dispensers 70 to 73 is determined by a selective control device 76 which is also actuated by the carriage 3 when it arrives in its right-hand position and which makes it possible, in accordance with its setting, to lower the particular dispenser which corresponds to the filter in use during the preceding sweep.

This control device 76 comprises three juxtaposed bars 77, 78 and 79, which are axially movable in supports 80 and 81, and form a support for the lateral pegs 82 of the dispensers (FIGS. 2 and 3). The auxiliary bars 77 and 79 possess, at their right-hand end (FIG. 3), fittings **77*a* and 79*a* which come to rest against two retaining electro-magnets 83, 84** when the bars are pushed back towards the right.

The central bar 78, which constitutes an actuating bar, possesses, at its left-hand end, a vertical finger **78*a* intended to cooperate with a projection 85 of the carriage 3, as well as a transverse plate 86 forming a stop for the adjacent ends of the two bars 77, 79**.

Figure 7:
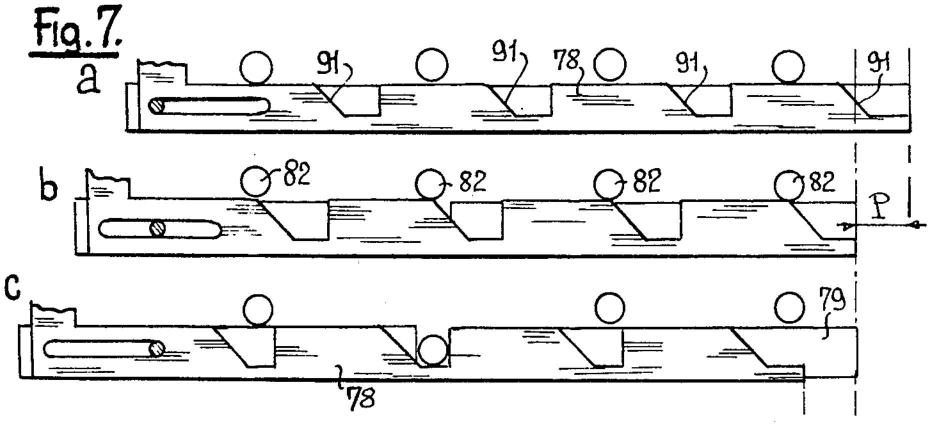
FIGS. 7 and 8 show a control mechanism for the machine, in different operating positions thereof.

When the carriage 3 arrives, at the end of its sweep, in its right-hand position in FIG. 1, the projection 85 resting against the finger **78*a* pushes the actuating bar 78 back into the rear position shown in FIGS. 2, 3 and 7*a*** during a first movement from left to right.

The two auxiliary bars 77 and 79, resting against the plate 86, are thus also brought into the rear position shown in FIGS. 2 and 3, in which their fittings **77*a*, 79*a* are brought into contact with the electro-magnets 83 and 84 (FIG. 3**).

When the carriage 3 starts again towards the left, the actuating bar 78, pushed towards the left by a spring 87 (FIG. 1) follows it in the course of a second movement from right to left. The auxiliary bars 77 and 79, also pushed towards the left by springs which are not shown, can now either follow the bar 78 or remain stationary depending on whether the corresponding retaining magnets 83, 84 are excited or not. The possible displacement of the bars 77 and 79 is limited to a particular stroke, indicated by P (FIG. **8*a*), by a peg 89 which engages in a slot 90** of the bars.

The actuating bar 78 possesses four ramps 91 (FIG. **7*a*) which, for the displacement P of this bar, are brought into the immediate vicinity of the pegs 82 of the dispensers (FIG. 7*b***).

The auxiliary bars 77 and 79 each have four notches, 92 on bar 77 and 93 on bar 79 (FIG. **8*a*), distributed, as explained later, in such a way that only one of the dispensers can descend in the course of the actuating bar 78** continuing its travel to the left.

Thus, if neither of the auxiliary bars 77, 79 is retained, these two bars advance by the stroke P and the mechanism assumes the position shown in FIG. **8*a*, in which the two first notches, opposite one another, are located underneath the peg 82 of the dispenser 70**, which can thus descend.

If only the bar 79 is retained, the mechanism assumes the position shown in FIG. **8*b*, in which it is the second notches, corresponding to the dispenser 71**, which are opposite one another.

Figure 8:
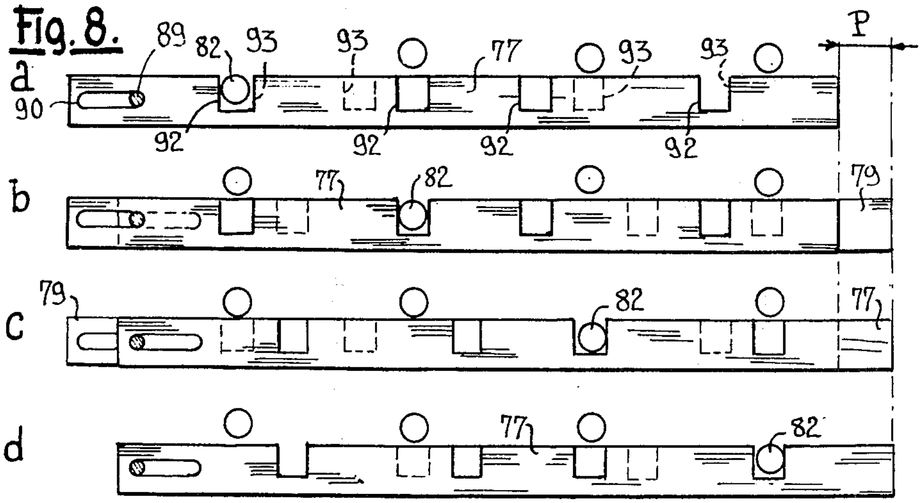

In the position shown in FIG. **8*c*, in which only the bar 77 is retained, and in the position shown in FIG. 8*d*, in which both bars are retained, it is respectively the notches corresponding to the third dispenser and to the fourth dispenser which are opposite one another. Thus, by means of the two auxiliary bars 77 and 79** each being able to occupy two control positions, it is possible to obtain, in accordance with the state of excitation of the two retaining electro-magnets, the four binary combinations 00-01-10-11 each of which corresponds to the actuation of a different dispenser.

When the actuating bar 78 continues its travel to the left, while the auxiliary bars 77 and 79 can no longer follow it, the ramp 91 passing in front of the aligned slots located under a peg 82 allows the corresponding dispenser to descend.

In FIG. **7*c*, this situation has been shown for the second dispenser 71, the corresponding peg 82 having descended in the second aligned notches of the bars 77 and 79 (compare also FIG. 8*b*), while the other three pegs 82** are held up by either one or the other auxiliary bar.

During the movement of the actuating bar 78 towards the right, the previously lowered dispenser is firstly lifted up again and then the two auxiliary bars 77 and 79 are brought into contact with their retaining magnets.

The selection of the dispenser in relation to the choice of the filter previously brought into operation is made automatically by means of three switches 95, 96 and 97 (FIG. 11), coupled to the switches 43, 44, 45. The four switches 42, 43, 44 and 45 which have already been mentioned, and these three switches 95, 96 and 97 which are coupled to them are grouped in a single contactor V (FIG. 11) which automatically selects the dispenser in accordance with the choice of the filter-holder slide.

Thus, for example, to the opening of the switch 43, which corresponds to the selection of the second filter slide 32, there corresponds the closing of the switch 95 which excites the electro-magnet 83 corresponding to the bar 79. During the next return travel of the carriage 3, the control mechanism as a result assumes the position shown in FIG. 8*b*, corresponding to the second dispenser 71 being put into operation.

On issuing from the developing device B, the film passes through the fixing device C consisting, for example, of a heating roller, before being fed into the receptable 14.

As a result of the cam 46 turning automatically by a quarter of a turn after each exposure, it is possible to obtain, with appropriate filters and by using four successive exposures, four images which permit a four-colour reconstitution (of the image). It is also possible to provide control devices comprising a selector 94 included in the panel 17 (FIG. 9) which makes it possible to produce automatically, depending on the setting of the selector, an automatic sequence of four successive exposures, or of a smaller number of exposures relating to a given smaller number of colours.

In a variant, the equipment can in particular be constructed so as to allow sequences of three exposures through three appropriate filters, for the purpose of a three-colour reconstitution (of the image).

Buttons 98 on the panel 17, corresponding to the switches 42 to 45, also make it possible to carry out individual or repeated exposures in each of the colours after the selector 94 has been brought into a position which renders the cam 46 inoperative.

The developers used to form the images are preferably dry developers comprising a magnetic core coated with a polymer containing one or more sublimable dyestuffs, which are transferred onto a joint support by sublimation, in a machine of which the receptacle 14 can form the input station. Exact positioning of the different images is obtained without difficulty by means of the perforations produced in the images.

In the machine shown, use is made, for the actuation of the filter selection mechanisms, on the one hand, and of the dispensers, on the other, of a reciprocating movement which the carriage of the exposure device necessarily executes in view of the sweeping of the image. It is thus the single motor 10, which controls the movements of this carriage, which provides the energy necessary for moving the filter-holder slides and the dispensers. Furthermore, the retaining electromagnets operate solely by a sticking mechanism, without themselves causing movements, and their excitation can be restricted to a short period of time. The mechanisms provided have the advantage of being very simple and of consuming little energy.

What we claimed is:

1. A color reprography machine for producing color separations of an original to be copied onto a photosensitive film, said machine comprising:

- exposure means, mounted for movement from a storage position along a path positioned between an original and a photosensitive film, for exposing said original and reflecting an image therefrom to said film;
- a filter magazine attached to said exposure means and containing a plurality of superposed parallelly mounted optical filters, said filters being individually movable between an operative position interposed in the path of said image and an inoperative position out of said path of said image;
- stop means on said exposure means for moving all of said filters, upon movement of said exposure means to said storage position, to said respective inoperative positions;
- means operable by movement of said exposure means for moving a selected one of said filters to the operative position thereof;
- retention means on said magazine for retaining all said filters but said selected one filter in the respective inoperative positions;
- a plurality, equal in number to the number of filters, of developing dispensers for developing on said film an image corresponding to a respective one of said filters;
- means operable by said retention means for moving the respective said developing dispenser corresponding to said selected filter to a dispensing position; and
- perforating means, operable by movement of said exposure means, for punching at least one register cut-out in said film.

2. A machine as claimed in claim 1, wherein said retention means comprise separate electromagnets for each filter.

3. A machine as claimed in claim 1, wherein each said filter is mounted on a separate slide mounted for movement within said magazine.

4. A machine as claimed in claim 1, wherein each of said developing dispensers are movable from a storage position to a dispensing position, and wherein said dispenser moving means includes a movable actuating bar operatively connected to said dispensers, said actuating bar having a member positioned in the path of said exposure means to be moved in a first direction thereby.

5. A machine as claimed in claim 4, wherein said actuating bar has therein a plurality of inclined surfaces, one each for a corresponding dispenser, said inclined surfaces operable when said actuating bar is moved in said first direction to move all of said dispensers to said respective storage positions; and further comprising return means for moving said actuating bar in a second opposite direction; and at least one selectively movable auxiliary bar means for cooperating with said inclined surfaces, after movement of said actuating bar in said second direction, to move a selected one of said dispensers to said dispensing position thereof.

6. A machine as claimed in claim 5, further comprising retaining means, operable in synchronization with said retention means, for preventing movement of selected of said auxiliary bar means.

7. A machine as claimed in claim 6, wherein said retaining means comprise separate electromagnets for each of said auxiliary bar means.

8. A machine as claimed in claim 6, further comprising electrical switch means for operating all but a selected one of said retention means and for synchronously operating selected of said retaining means.

9. A machine as claimed in claim 5, including four filters, four dispensers each having a peg, and two auxiliary bar means each having four notches therein, each said auxiliary bar means being movable between two control positions, whereby when said actuating bar is moved in said second direction said notches of said auxiliary bar means are aligned to receive the peg of a selected said dispenser.

10. A machine as claimed in claim 1, wherein said perforating means comprises a bar movable in a direction parallel to the direction of movement of said exposure means, at least one punch movable at right angles to the direction of movement of said bar, at least one cam means on said bar cooperating with said punch upon movement of said bar to move said punch to a perforating position, and a catch pivotally mounted on said bar in a position to be contacted by said exposure means for movement of said bar thereby, said catch pivoting out of contact with said exposure means after movement of said punch to said perforating position.

11. A machine as claimed in claim 10, wherein said punch is dimensioned to form means for producing cut-outs in said film such that the cut-out parts remain attached to said film.

* * * * *